United States Patent [19]

Eissfeldt

[11] 4,030,675
[45] June 21, 1977

[54] APPARATUS FOR FILM AND TAPE WINDING

[76] Inventor: Werner Eissfeldt, Blutenstrasse 3, 62 Wiesbaden-Rambach, Germany

[22] Filed: Jan. 26, 1976

[21] Appl. No.: 652,044

[30] Foreign Application Priority Data

Jan. 25, 1975 Germany .......................... 2503116

[52] U.S. Cl. ............................ 242/55.18; 242/71.8
[51] Int. Cl.² ................... G11B 23/02; B65H 75/22
[58] Field of Search ........... 242/55.18, 71.8, 118.5; 352/128, 126

[56] References Cited

UNITED STATES PATENTS

| | | | |
|---|---|---|---|
| 2,473,074 | 6/1949 | Reynolds | 242/55.18 |
| 2,475,036 | 7/1949 | Lopez-Henriquez | 242/55.18 X |
| 2,670,202 | 2/1954 | Gregg | 242/55.18 |
| 3,404,851 | 10/1968 | Pfarrwaller et al. | 242/118.5 |
| 3,724,771 | 4/1973 | Zielke | 242/71.8 X |

Primary Examiner—Billy S. Taylor
Attorney, Agent, or Firm—Dennison, Dennison, Meserole & Pollack

[57] ABSTRACT

A tape reel apparatus for recording and reproduction of motion picture film or audio tape wherein the tape is pulled off of the supply reel from the innermost convolution thereby obviating the necessity for tape rewinding after use. A pair of spaced reel plates or flanges are joined by a hub and the one plate is provided with means in the form of a ring or a roller on which the rewound tape or film may rotate with respect to the stationary reel plate. The stationary plate has a side release opening for exit of the film or tape from the innermost convolution and a guide device leads the beginning of the film or tape out of the release opening.

12 Claims, 20 Drawing Figures

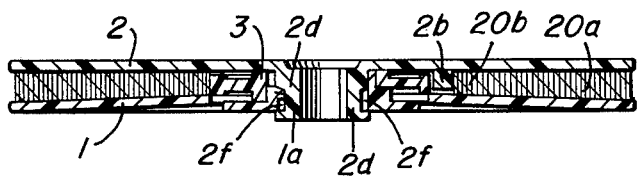
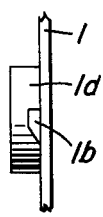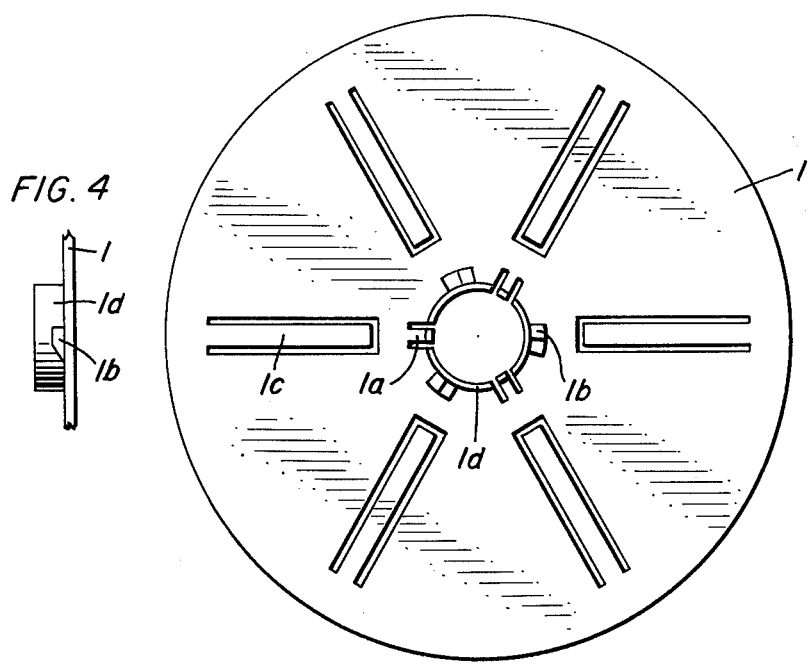
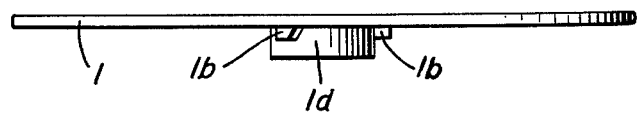

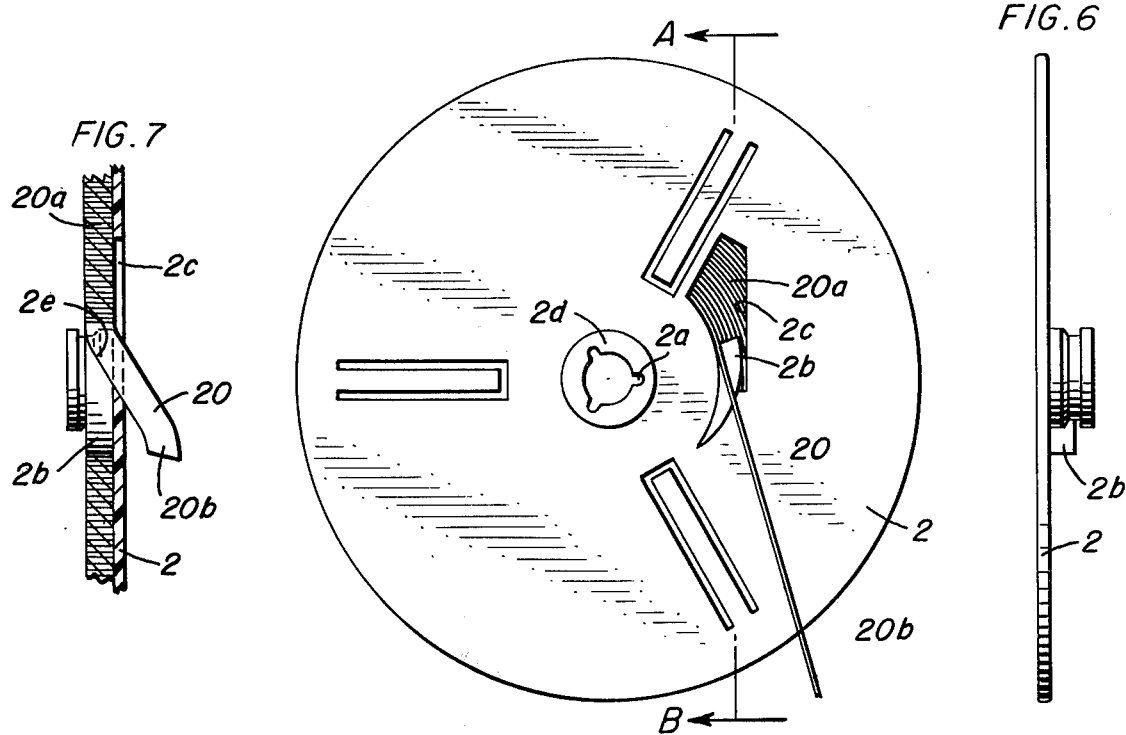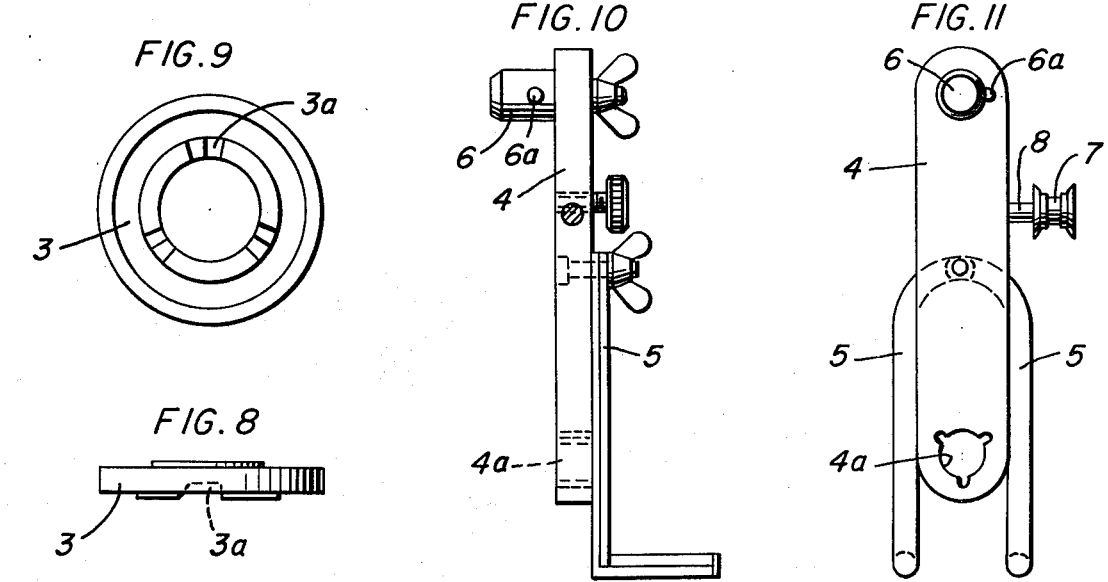

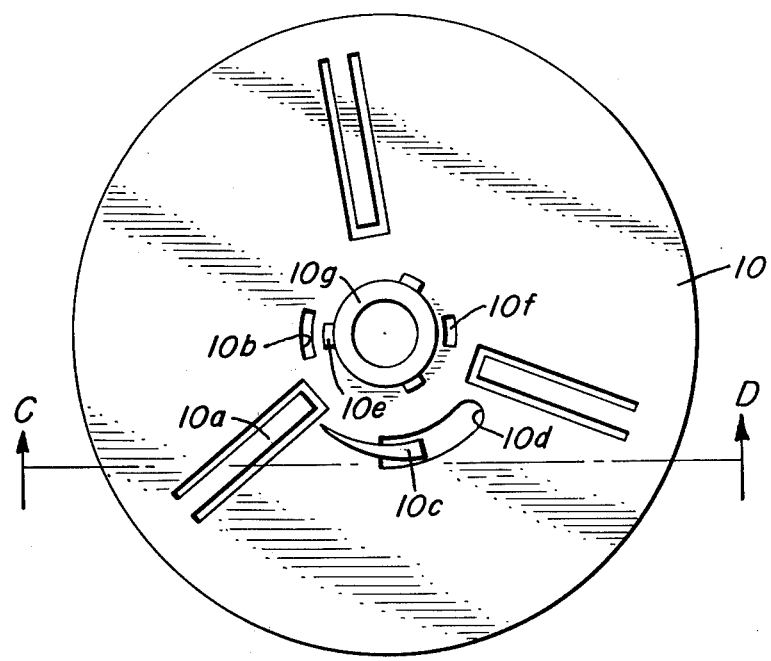
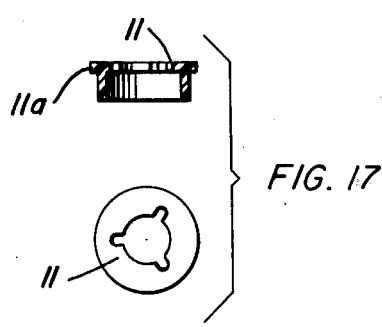
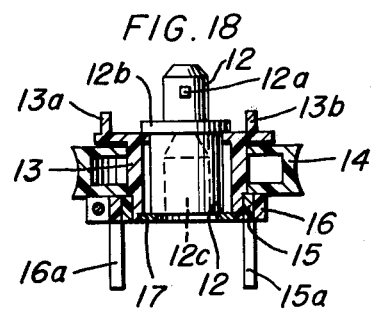
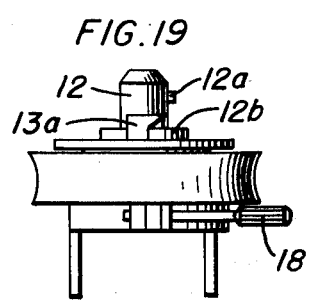
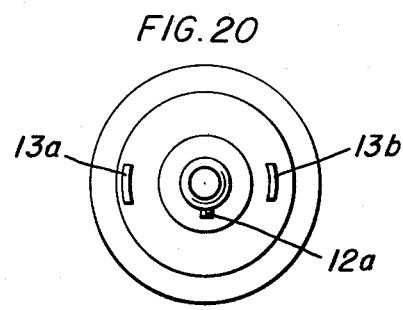

APPARATUS FOR FILM AND TAPE WINDING

This invention concerns an apparatus for the playing and winding of recording tapes or motion picture film, in particular for audio and video tapes, without the need for subsequent rewinding, whereby the recorded tape runs from a supply reel and over the reproduction area, and then to the rewinding reel where it is rewound.

During the reproduction of audio and video tapes, as we know, with most commercial units, the recorded tape is pulled from the outside of a reel and is led over the reproduction area before running back to a second rewinding reel so that the beginning of the tape ends up on the inside of the reel. This also applies to cassette players which contain a winding and a supply reel. In order to be able to play the tape once more from the beginning, it is necessary to rewind it.

Procedures and devices have already been introduced for the winding of recorded tapes without the need for subsequent rewinding; however, these procedures are complicated and the devices are not compatible with units which are already on the market.

The aim of the present invention is to provide a procedure and a device of the type already mentioned which can be adapted to reproduction units already on the market.

The aforementioned task is solved by having the beginning of the recorded tape pulled from the center of the wound tape roll, namely through a side opening of a flange of the supply reel which is stationary, and is crossed over the wound tape roll with the wound tape roll being freed for rotation. This new arrangement therefore consists of having the beginning of the film or tape drawn from the center of the reel, and once reproduced, being once more wound onto the center of the reel.

The device used for this procedure is characterized by the fact that it consists of a reel made up of at least two parts, one plate having a release opening and the other plate equipped with a winding device, both plates being secured together in spaced relation by a hub and having a changeable spacing, whereby a pulling device is provided for pulling the beginning of the tape from the release opening. This type of reel enables the pulling of the beginning of the tape from the release opening diagonally over the wound roll without coming in contact with the latter, whereby the roll can rotate in relation to the wound release opening. Since this crossing of the wound roll requires a feeding plane adjacent to the main winding plane, a minor twisting of the tape occurs which, however, has no effect as far as wear and tear is concerned. For use in conjunction with units which are already on the market, an adapter or axial extension can be used if required. Otherwise, the new reels are to be used just like the conventional reels.

Other characteristics of the invention will be apparent from a reading of the specification and are illustrated by the accompanying drawings wherein:

FIG. 1 is a cross-sectional view of the preferred type of construction of the new reel;

FIGS. 2 to 9 are partly split side views of individual parts of the reels;

FIGS. 10 and 11 are a side view and plan view of an adapter;

FIGS. 13 to 17 are partly split side views of individual parts of the second type of construction of the reel; and FIGS. 18 to 20 are partly split side views of an axial extension.

Figure 12:
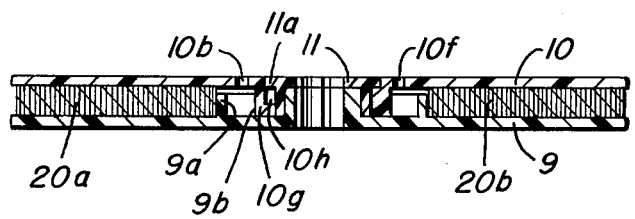
FIG. 12 is a cross-sectional view through a second type of construction of the reel.

Reference is made to FIGS. 1 to 9 which illustrate the preferred form of construction of a reel made up of three parts, namely a first flange or plate 1, a second flange or plate 2, and a roller 3. The plate 2 is equipped with a hub 2d on the outer surface of which three grooves or a radial groove 2f are provided in the axial direction. The plate 1 has flexible projections 1a which fit into the groove 2f in hub 2d is such a way that both plates 1, 2 are joined, however, the plates can still be moved axially with respect to each other by a distance determined by the length of the groove 2f and the thickness of the gripping hooks on projections 1a. Aligning with projections 1a, plate 1 is provided with a bearing 1d about which roller 3 runs. Roller 3 is provided with notches 3a as seen in FIG. 8 with a trapezoidal cross-sectional area with the latter working in conjunction with correspondingly-shaped cams 1b of plate 1 in such a way that a lifting occurs over the vertical surfaces between plate 1 and roller 3 whereas over the inclined plane, an axial displacement between flange parts 1 and 3 takes place. The plate 1 thus moves away from plate 2 until the hook of the projection 1a reaches the end of its groove 2f. The plate 1 is further provided with a series of radially arranged flexible tongues 1c which guide a running tape in the direction of the roller 3.

On the inside, the hub 2d has three axially aligned grooves, in which one groove 2a is somewhat wider and plate or flange 2 is provided with an upward release opening 2c as shown in FIG. 5. The release opening 2c is provided with a guiding device for the beginning of the tape, which consists of a projection 2b mounted at a certain distance from the reel axis and provided with a ramp surface 2e which is inclined in relation to the reel axis, as can be best seen from FIG. 7. Moreover, the projection 2b6 is curved and wedge-shaped, as shown in FIG. 5. When the tape 20, which forms a wound roll 20a, turns with the roller 3 relative to the plates 1, 2, these move away from each other as a result of the action of the cam surfaces of cams 1b on the notches 3a, so that the wound roll 20a is no longer tightly held and is thus freed. The rotation further causes the inner end 20b of the tape to hit the projection 2b and in particular the ramp surface 2e, and is thus led toward the outside. In order to make this process easier, the inner end 20b is cut diagonally. As can be seen from FIG. 7, the tape beginning 20b, once pulled, leaves the winding plane of the wound roll 20a, and can then be moved on adjacent feeding plane diagonally in relation to the wound roll 20a, thus crossing it. A tape can thus be continuously pulled, whereby the wound roll 20a turns in conjunction with the roller 3 on the bearing ring 1d while plates 1, 2 remain stationary.

The winding process occurs in the usual way starting from the core of the reel and thus does not require individual explanation.

FIGS. 10 and 11 illustrate an adapter consisting of a carrier 4 equipped with notches 4a, a supporting bracket 5 and a reel stub shaft 6 with a reinforced rib 6a. The adapter can also be equipped with a roller 7 which is mounted on a shaft 8 and which can be clamped down in an appropriate position. The adapter is pushed together with the notch 4a on the non-activated reel axis of the reproduction unit (projector), with the arms of the bracket 5 serving as support. The supply reel is led over the axis 6, whereby the rib 6a grips onto the broader groove 2a of the supply reel. The roller 7 serves to guide the drawn tape 20.

Figure 13:
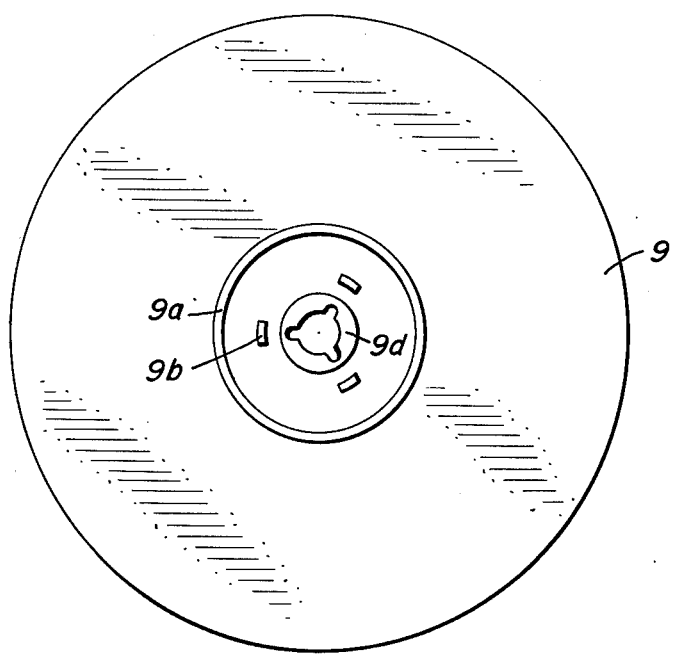
Figure 14:
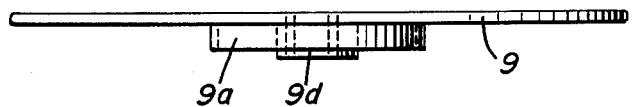
Figure 16:
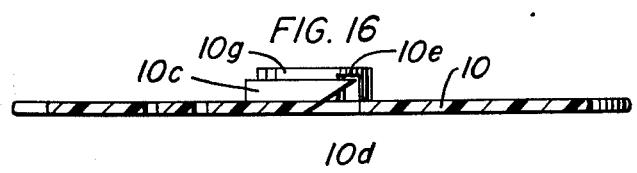

An additional type of construction of the new reel is illustrated in FIGS. 12 to 17. The reel, in this case, also contains a first plate 9 and a second plate 10 which are joined by means of a cap-type clamping device 11, whereby a specific distance can be kept between the plates. For this purpose, the dimensions of cap 11 and of hub 9d are determined so that when they are pushed against one another, clamping occurs, while there is clearance between hub 10g of the other plate 10 and the outer periphery of the cap 11. The cap 11 is provided with a flange-type projection 11a which lies inside a circular notch 10h in the hub 10g which limits the displacement of both plates 9 and 10. Cams 9b and 10e of plates 9 and 10 which hit against one another lead to a separation of the plates in one direction of rotation.

Instead of the roller 3 a fixed ring 9a can be used as a winding device on the plate 9. The other plate 10 is then provided with a release opening 10d in which a projection 10c again projects inward and serves to lead out the inner beginning of the tape, as was the case in the first type of construction illustrated by FIGS. 1 to 9. When the plate 10 rotates against the wound roll, the slanted beginning section of the tape hits the projection 10c and is thus led outward. In order to maintain the position of the plate 10, notches 10b and 10f are provided, in which the stationary member engages.

The axial extension, as shown in FIGS. 18 to 20, is to be considered as such a stationary member. The axial extension is provided with a recess 12c which can be attached to the end of a unit stub shaft and which has a pin 12 which attaches onto the unwinding reel. This pin 12 has a lug or rib 12a which grips onto the corresponding groove of the reel, as well as a flange or shoulder 12b against which the reel rests. The pin 12 is mounted onto a bearing 13, whereby on the one side the flange 12b, and on the other a ring 17, serve as axial fixation for the pin 12. The bearing 13 is equipped with projections 13a and 13b which are provided with slanted surfaces and serve as attachments onto notches 10b and 10f of the reel, as shown by FIGS. 12 to 17. Through slight rotation of the bearing device 13, the plate 10 is not only held fast, but is also displaced axially in relation to the hub 9d, thus releasing the wound roll. Two additional rings 15 and 16 are mounted in a rotating fashion onto the bearing 13, which are provided with pegs 15a and 16a which serve to secure the reproduction unit (or reel arm as the case may be). A clamping screw 18 is used for the clamping once the lugs 13a and 13b are returned to their correct winding position, thus maintaining the reels in the correct position. A roll 14 is provided on the outer edge of the bearing 13, with said roll 14 resting on the bearing surface of the recorded tape around the winding surface. The tape unrolled from the reel is then guided around the roll 14 before running over the reproducing area and then to the rewinding reel. The axial extension, as shown in FIGS. 18 to 20, offers an advantage in that the reel plate 9 creates a joint between the wound roll and the unit, namely over the ring 9a, the hub 12, the notches 12c up to the end of the unwinding reel of the unit, so that the friction caused by the unwinding becomes effective inside the unit, and thus maintaining a tight braking effect, i.e. on the tape.

When using the reel shown in FIGS. 1 to 9, the axial pin 12 does not need to rotate against the bearing 13.

In order to replay individual parts of the recorded tape, the latter is made to rewind, whereby, in accordance with the type of construction shown in FIGS. 12 to 17, the reproduction tape must have the possibility of rewinding at least partly onto the spool. With the reel shown in FIGS. 1 to 9, we can assume, when making a unit for use with film, that the reproduction unit, i.e. the projector, will be raised during the projection, so that when the tape is rewound, a good section of the tape can run unwound without the runner touching the ground. When rewinding forward, this runner is first drawn in.

Since the winding of the recorded tape onto the new reel is no different from the conventional reel, they can also be used according to the known method whereby the beginning of the tape is on the outside of the wound roll.

I claim:

1. Apparatus for the handling and storage of recorded tapes or motion picture film on reproducing apparatus without the necessity of rewinding after use, said apparatus comprising a pair of spaced first and second reel plates (1, 2, 9, 10), said first plate being stationary and having a hub (2d, 9d) extending centrally and axially therefrom and being attached centrally and axially to said second reel plate, said second reel plate having winding means (3, 9a) thereon, an exit opening (2c, 10d) in said first reel plate, and means for varying the distance between the reel plates whereby tape or film stored in a wound roll in said apparatus may be pulled through said exit opening when said distance is enlarged, said wound roll then being free to rotate together with said winding means on said second reel plate.

2. Apparatus as defined in claim 1 and further including guide means (2b, 10c) for leading the beginning of the tape or film out of the exit opening.

3. Apparatus as defined in claim 2 wherein said guide means includes a projection (2b, 10c) spaced from the axis of the reel plates and having a surface (2e) inclined with respect to the reel plate axis for leading out the tape or film.

4. Apparatus as defined in claim 3 wherein said projection is curved and wedge-shaped.

5. Apparatus as defined in claim 1 wherein the winding means comprises an annular roller (3) mounted on a ring section (1d) of said second plate (1).

6. Apparatus as defined in claim 5 wherein said means for varying the reel plate distance includes a plurality of notches (3a) on said roller having a trapezoidal cross section, said second reel plate (1) being provided with cam means (1b) which grip in said notches so that when said roller rotates, a relative axial displacement occurs between said reel plates.

7. Apparatus as defined in claim 6 wherein said hub (2d) is provided with an axial groove (2f) and said ring section (1d) is provided with a lug (1a) fitting in said axial groove so that a coupling is provided during rotation and limits the axial displacement.

8. Apparatus as defined in claim 1 wherein the winding device consists of a ring (9a) which is secured tightly on said second plate (9).

9. Apparatus as defined in claim 8 wherein said second plate (9) is provided with said hub (9d) and the first plate (10) is equipped with a ring section (10g), and a clamping cap (11) is adapted to be clamped on said hub and holds the first plate.

10. Apparatus as defined in claim 9 wherein said cap (11) is provided with a flanged projection (11a) and said ring section is provided with a notch, thus limiting the axial separation of the plates.

11. Apparatus as defined in claim 1 wherein the first reel plate is provided with gripping notches (10d, 10f).

12. Apparatus as defined in claim 1 and further including a mounting adapter for positioning said reel plates for winding, said adapter including a carrier 4 having a plurality of axial notches (4a) for attachment onto reproduction equipment and a reel pin (6) mounted on said carrier for attachment of said reel plates.

* * * * *